March 29, 1927.
A. E. MILLER
1,622,919
AUTOMATICALLY VARIABLE CRANK MOTION
Filed May 29, 1926   3 Sheets-Sheet 2
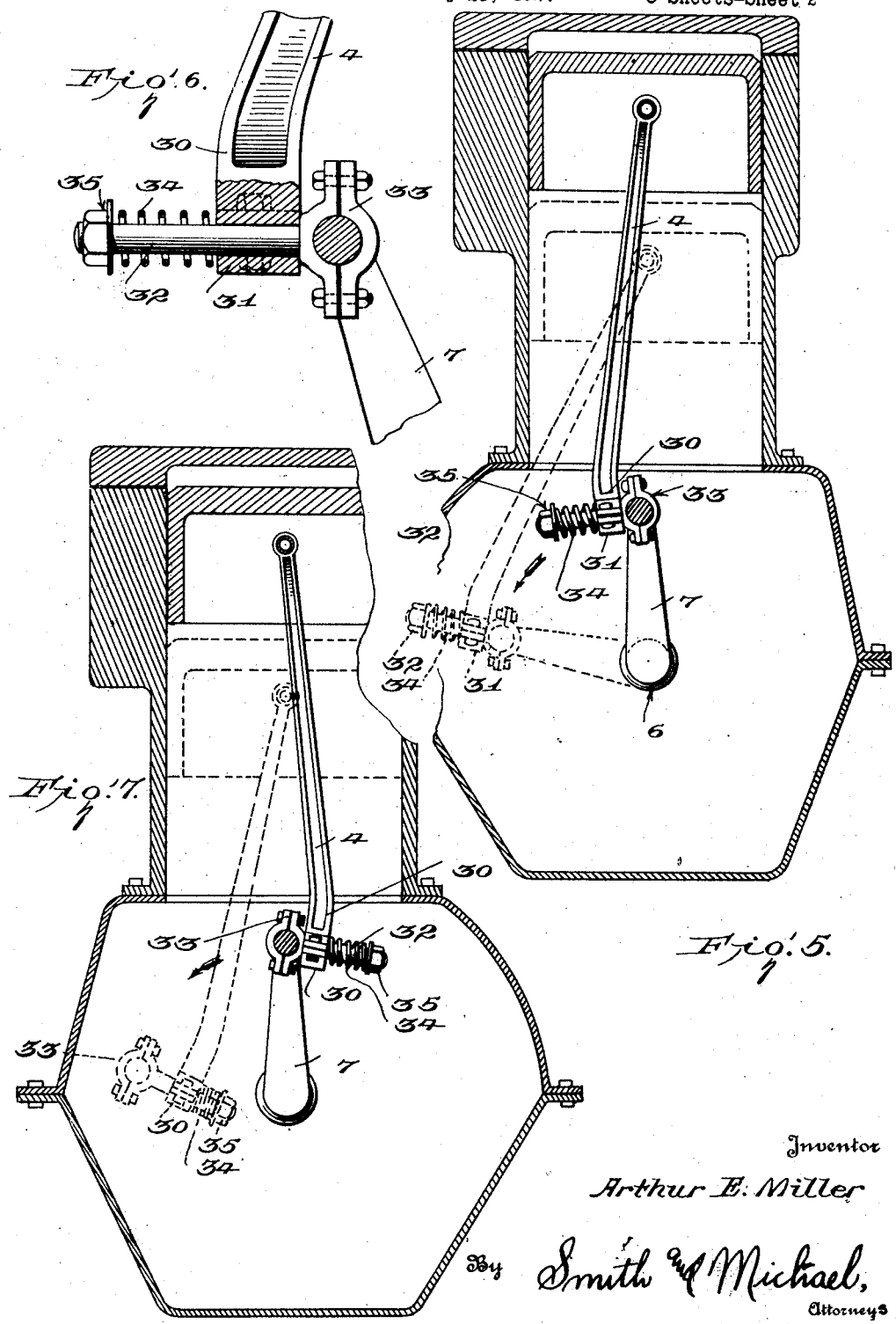
Inventor
Arthur E. Miller
By Smith & Michael,
Attorneys March 29, 1927.
A. E. MILLER
1,622,919
AUTOMATICALLY VARIABLE CRANK MOTION
Filed May 29, 1926   3 Sheets-Sheet 3
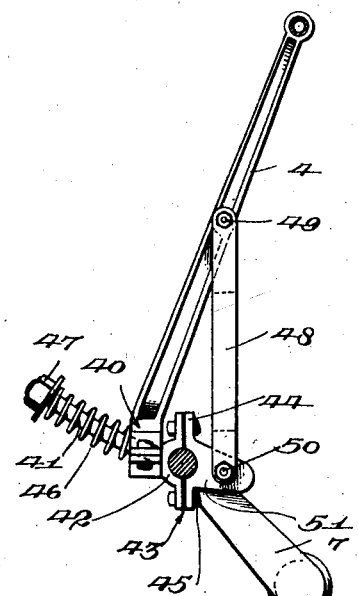
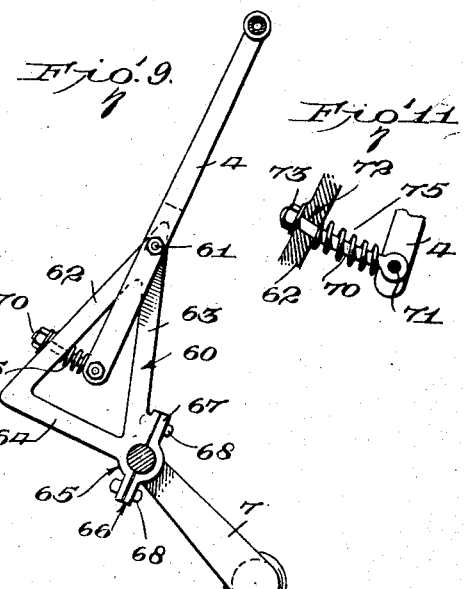
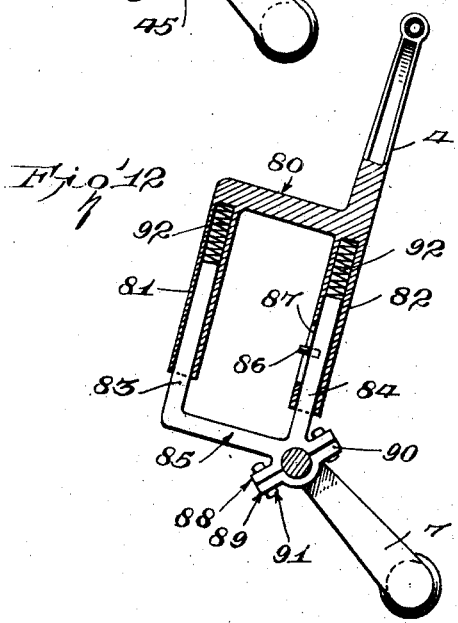
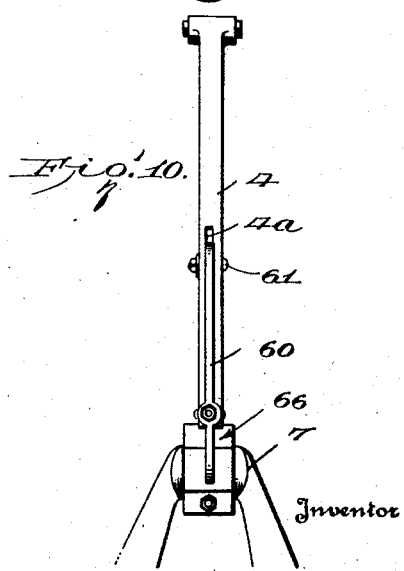
Inventor
Arthur E. Miller
By Smith and Michael,
Attorneys Patented Mar. 29, 1927.

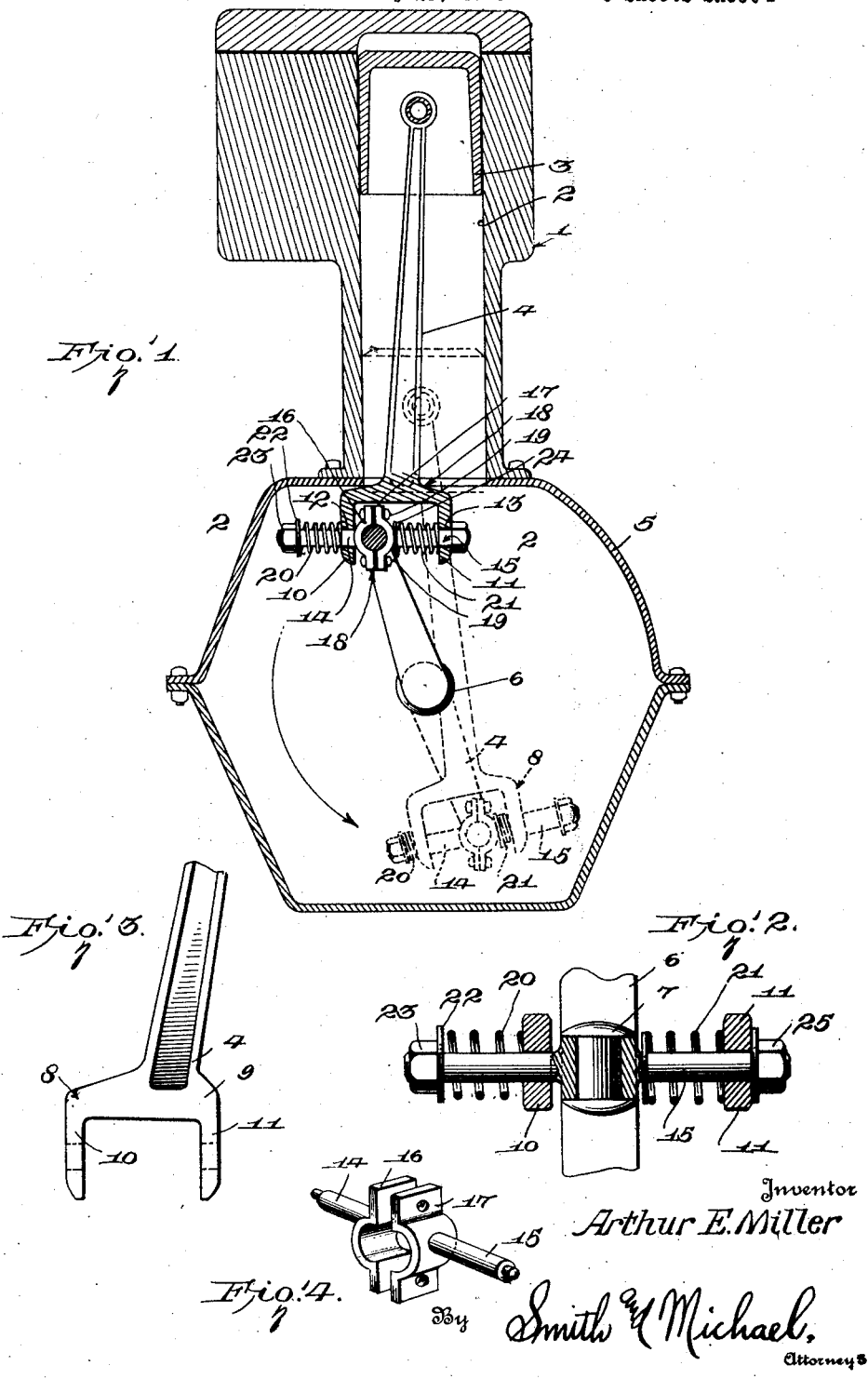

1,622,919

UNITED STATES PATENT OFFICE.

ARTHUR E. MILLER, OF SACRAMENTO, CALIFORNIA.

AUTOMATICALLY-VARIABLE CRANK MOTION.

Application filed May 29, 1926. Serial No. 112,554.

This invention relates to means for connecting the connecting rod of an engine or machine to the crank shaft thereof and it is principally designed for use upon or in connection with automobile engines, although of course adapted for practically universal application.

One of the principal objects of the invention is to provide means of this character which is operable to vary automatically the effective lever arm between the connecting rod and the crank shaft, thereby increasing the power ratio when such increase is desirable. The variation in the effective lever arm and the consequent variation in the power ratio is governed by the load to which the engine or power plant is subjected, the lever arm remaining constant under ordinary conditions of load and increasing automatically when the load exceeds a predetermined amount. Thus, when the invention is embodied in an automobile engine the effective lever arm increases when starting or when climbing a hill or at other times when the load increases.

A further object is to provide means of this character and having these advantages and capacities and which may be and is constructed without modifying any of the standard and conventional features of the ordinary crank shaft.

Accordingly in its broader aspects the invention comprises in conjunction with a crank shaft having the usual cranks and also a connecting rod for each crank, means for connecting the connecting rod to the crank in such manner as to automatically vary the effective lever arm between the connecting rod and the crank shaft. In carrying out this purpose a bearing member is pivotally mounted on the bearing portion of the crank shaft and has rigidly connected therewith guide means such as studs or the like on which guide means a slide bearing or bearings formed on the connecting rod are shiftably mounted. Spring means is provided to maintain the slide bearings of the connecting rod in predetermined position on the guide means.

Other objects and advantages reside in certain novel features of the construction, arrangement and combination of parts which will be hereinafter more fully described and particularly pointed out in the appended claims, reference being had to the accompanying drawings in which:

Figure 1 is a view partly in section and partly in elevation showing one embodiment of the invention applied to an automobile engine;

Figure 2 is a sectional view on line 2—2 of Figure 1;

Figure 3 is a fragmentary detail view of the lower end of the connecting rod;

Figure 4 is a detail perspective view of the bearing member applied to the crank;

Figure 5 is a view partly in section and partly in elevation showing another form of the invention;

Figure 6 is an enlarged detail view showing the mounting of the connecting rod of Figure 5 on its guide stud;

Figure 7 is a view similar to Figure 5 but illustrating a slight variation of the embodiment shown in Figure 5;

Figure 8 is a view in elevation showing another form of the invention;

Figure 9 is a view in elevation showing still another form of the invention;

Figure 10 is a view in elevation looking toward the left hand side of Figure 9;

Figure 11 is a fragmentary detail view partly in section and partly in elevation showing how the guide stud of Figure 9 and Figure 10 is mounted on its frame, and Figure 12 is a view partly in section and partly in elevation showing still another embodiment of the invention.

Referring to the drawings and more especially to Figures 1 to 4 inclusive the numeral 1 designates an automobile engine which has the cylinder 2 in which a piston 3 operates in the usual manner. The piston 3 is connected to the upper end of a connecting rod 4 in accordance with the usual practice. In suitable bearings provided therefor in a crank case 5 a crank shaft 6 is rotatably mounted. This crank shaft 6 is of the usual construction and has the ordinary cranks 7.

The present invention proposes the provision at the lower end of the connecting rod 4 of of a yoke designated generally at 8, the yoke 8 having a body portion 9 integral with the lower end of the connecting rod 4 and disposed at an angle to the connecting rod. The angle at which the body 9 is located relative to the longitudinal axis of the connecting rod 4 is not a right angle but is preferably as near to a right angle as it may be. As clearly shown in Figures 1 and 3 the body portion 9 of the yoke extends farther to one side of the connecting rod than to the other and at its ends has integral arms 10 and 11 which are located at right angles to the body portion 9 but which are angled rather than paralleled to the connecting rod 4. These arms 10 and 11 are provided with transversely alined openings 12 and 13 in which trunnions 14 and 15 are snugly and slidably fitted, the trunnions being fixedly secured to the parts 16 and 17 of a bearing member designated generally at 18 and secured for pivotal movement on the crank 7. Preferably the parts of the bearing member 18 are held onto the crank 7 by the usual nuts and bolts 19. Displacement of the arms of the yoke from the trunnions is prevented by virtue of the fact that one of the arms engages its bearing member before the other arm is at the outer end of its trunnion.

For the purpose of maintaining the yoke in a certain predetermined position under normal working conditions and load and yet permitting automatic shifting of the yoke when the load exceeds a predetermined value compression coil springs 20 and 21 are mounted on the trunnions or guide studs 14 and 15 respectively. The spring 20 engages the outer side of the arm 10 of the yoke and abuts a washer 22 held on the outer end of the stud by a nut 23. The spring 21 engages the inner side of the arm 11 of the yoke and abuts a washer 24 which engages the part 17 of the bearing 18. To the outer end of the trunnion or guide stud 15 a nut 25 may be secured.

Under ordinary conditions of load, the yoke 8 has its arms positioned on the trunnions or guide studs 14 and 15 of the bearing member 18 as shown in full lines in Figure 1 and this position and relation of the parts prevails until the load exceeds a predetermined value as when starting or climbing a hill, whereupon the yoke slides on the guide studs or trunnions against the action of the springs 20 and 21 as illustrated in dotted lines in Figure 1. This shifting of the yoke has the effect of increasing the effective lever arm of the connection between the connecting rod and the crank shaft thereby increasing the power ratio when such increase is highly desirable if not necessary. As soon as the load decreases to normal the springs which have been compressed expand to shift the yoke back to its normal position.

In the form of the invention shown in Figures 5 and 6 the means for connecting the connecting rod to the crank 7 of the crank shaft 6 is slightly varied in that the yoke at the lower end of the connecting rod is omitted and is replaced by an offset lower end 30 having a slide bearing 31 in which a single guide stud or trunnion 32 is slidably received. The guide stud 32 is fixed in any suitable way to a bearing member 33 pivotally and positively mounted on the bearing portion of the crank 7. A coil spring 34 encircles the guide stud 32, one end of the spring 34 bearing against the offset end 30 of the connecting rod and its bearing 31 and the other end of the spring 34 engaging a nut and washer 35.

The embodiment of the invention shown in Figure 7 is identical with that shown in Figures 5 and 6 and just described except that the guide stud 32 extends in an opposite direction from the crank 7.

In both forms of the invention shown in Figures 5 to 7 the bearing 31 of the connecting rod is held up against the bearing member 33 until the load exceeds a predetermined value whereupon the offset end 30 of the connecting rod slides out on the guide stud 32 to automatically increase the effective lever arm. When the load drops back to normal the parts are automatically repositioned.

In the form of the invention shown in Figure 8 the connecting rod 4 has an offset bearing 40 at its lower end and this bearing is slidably mounted on an arcuate guide stud 41 fixed to one part 42 of a bearing member designated generally at 43. The other part of the bearing member is indicated at 44 and the parts 42 and 44 are secured about the bearing portion of the crank 7 by bolts and nuts 45. A coil spring 46 encircles the guide stud 41 and has one end abutting the bearing 40 and its other end abutting a nut and washer assembly 47 provided at the outer end of the guide stud 41. A link 48 is provided and has one end pivotally connected as at 49 to an intermediate portion of the connecting rod 4 while its other end is pivotally connected as at 50 to a lug 51 integral with or otherwise fixedly secured to the part 44 of the bearing 43. In this form of the invention the spring 46 yields under abnormal loads to increase the effective lever arm.

In the form of the invention shown in Figures 9, 10 and 11 the connecting rod 4 has its inner end slotted as indicated at 61, the apex of the triangular frame operating in the slot 4ª. The triangular frame 60 is made up of bars 62, 63 and 64 integral with or otherwise suitably connected to each other. At the juncture of the bars 63 and 64 a part 65 of a bearing member designated generally at 66 is integrally formed or otherwise suitably connected. This part 65 of the bearing member 66 is fitted against the bearing portion of the crank 7 and is held in such engagement by a complementary bearing part 67 and bolts and nuts 68. The inner end of the connecting rod 4 has a guide stud 70 suitably connected as at 71 to its inner end and this guide stud 70 is slidably fitted in an opening 72 provided therefor in the bar 62 of the frame 60. A nut 73 prevents the stud 70 from being pulled entirely out of the opening 72. A coil spring 75 encircles the stud 70 between the connecting rod and the bar 62. In this form as in the others the lever arm remains the same until the load exceeds a predetermined value whereupon the spring 75 is compressed to increase automatically the effective lever arm.

In the form of the invention shown in Figure 12 the connecting rod 4 has an offset yoke 80 at its inner end, the yoke 80 having tubular arms 81 and 82 in which the legs 83 and 84 of a U-shaped frame designated generally at 85 are slidably fitted. The relative movement of the arms 81 and 82 and the legs 83 and 84 may be limited by means of suitable stops such as a pin 86 fixed to at least one of the legs such as the leg 84 and operating in a slot 87 provided in the tubular arm 82. At one corner of the frame 85 a part 88 of a bearing member designated generally at 89 is provided. The bearing member 89 is completed by a complementary part 90, the parts 88 and 90 being fitted and held on the bearing portion of the crank 7 by means of bolts and nuts 91. In this form of the invention as in the others when the load exceeds a predetermined amount springs 92 provided between the inner ends of the arms 81 and 82 and the legs 83 and 84 are compressed to increase automatically the effective lever arm.

I claim:—

1. The combination with a crank shaft having at least one of the usual cranks and a connecting rod for each crank, of means for connecting the connecting rod to said crank to automatically vary the effective lever arm between the connecting rod and the crank shaft and comprising a bearing member positively and pivotally connected to the crank and a shiftable connection between the connecting rod and said bearing member and having yieldable means for holding the connecting rod in a predetermined position relative to said bearing member until the load exceeds a predetermined amount.

2. The combination with a crank shaft having at least one of the usual cranks and a connecting rod for each crank, of means for connecting the connecting rod to the crank to automatically vary the effective lever arm between the connecting rod and the crank shaft and comprising a bearing member positively and pivotally connected to the crank, a shiftable connection between the connecting rod and said bearing member including guide means associated with the connecting rod and bearing member and spring means cooperable with the connecting rod and said guide means for maintaining the parts in predetermined position.

3. The combination with a crank shaft having a crank and a connecting rod for the crank, of means for connecting the connecting rod to the crank including a bearing member positively and pivotally connected to the crank, a guide stud rigidly connected to the bearing member, said connecting rod having a slide bearing at its lower end in which the guide stud is slidably fitted and a spring on the guide stud cooperable with the slide bearing.

4. The combination with a crank shaft having a crank and a connecting rod for the crank, of means for connecting the connecting rod to the crank including a bearing member positively and pivotally connected to the crank, a guide stud rigidly secured to the bearing member, said connecting rod having a slide bearing at its lower end and offset from the longitudinal axis of the connecting rod, said guide stud being slidably fitted in said slide bearing and a spring on the guide stud cooperable with the slide bearing.

5. The combination with a crank shaft having a crank and a connecting rod for the crank, a bearing member pivoted to the crank and having oppositely directed guide studs rigidly secured thereto, said connecting rod having an angled yoke formed with slide bearings in which the studs are slidably fitted and springs on the studs cooperable with the yoke.

6. The combination with a crank shaft having a crank provided with a bearing portion and a connecting rod for the crank, of a bearing member having parts embracing and rotatably fitted around the bearing portion of the crank, guide means rigidly connected with the bearing member, said connecting rod having slide bearings in which the guide means are slidably fitted and springs for maintaining the guide means and bearings in predetermined relation.

In testimony whereof I hereunto affix my signature.

ARTHUR E. MILLER.